United States Patent
Wern

(10) Patent No.: US 6,612,909 B2
(45) Date of Patent: Sep. 2, 2003

(54) MEDIA BLASTING APPARATUS AND METHOD TO PREVENT GEAR PITTING

(75) Inventor: Michael J. Wern, Mokena, IL (US)

(73) Assignee: Engineered Abrasives, Inc., Alsip, IL (US)

(*) Notice: Subject to any disclaimer, the term of this patent is extended or adjusted under 35 U.S.C. 154(b) by 0 days.

(21) Appl. No.: 09/866,462

(22) Filed: May 25, 2001

(65) Prior Publication Data

US 2002/0004356 A1 Jan. 10, 2002

Related U.S. Application Data

(63) Continuation-in-part of application No. 09/393,457, filed on Sep. 10, 1999, now Pat. No. 6,238,268.
(60) Provisional application No. 60/099,996, filed on Sep. 11, 1998.

(51) Int. Cl.$^7$ ................................. B24C 3/00
(52) U.S. Cl. ...................... 451/36; 451/75; 451/87; 451/99
(58) Field of Search ........................ 451/36, 75, 87, 451/88, 89, 99

(56) References Cited

U.S. PATENT DOCUMENTS

| | | | |
|---|---|---|---|
| 2,352,857 A | 7/1944 | Nachemov | 29/89 |
| 2,420,759 A | 5/1947 | Stelz | 77/4 |
| 2,725,685 A | 12/1955 | Hill | 51/15 |
| 3,419,894 A | 12/1968 | Burney et al. | 72/53 |
| 3,423,976 A | 1/1969 | Burney et al. | 72/53 |
| 3,613,424 A | 10/1971 | Normos | 72/103 |
| 4,167,864 A | 9/1979 | Taipale | 72/53 |
| 5,107,630 A | 4/1992 | Lodewijk | 51/410 |
| 5,216,848 A | 6/1993 | Abbott et al. | 51/410 |
| 5,251,468 A | 10/1993 | Lin et al. | 72/53 |
| 5,272,897 A | 12/1993 | Wern | 72/53 |
| 5,503,591 A * | 4/1996 | Morikawa et al. | 451/75 |
| 5,599,223 A | 2/1997 | Mains Jr. | 451/39 |
| 5,704,239 A | 1/1998 | Beals et al. | 72/53 |
| 5,709,587 A | 1/1998 | Shaffer | 451/38 |
| 5,879,223 A | 3/1999 | Frederick et al. | 451/85 |
| 6,238,268 B1 | 5/2001 | Wern | 451/36 |

FOREIGN PATENT DOCUMENTS

| | | |
|---|---|---|
| JP | 54-153315 | 11/1979 |
| JP | 63-96816 | 4/1988 |
| JP | 8-73930 | 3/1996 |

OTHER PUBLICATIONS

Society of Automotive Engineers, SAE Manual on Shot Peening, Apr. 2001, Fourth Edition, p. 6.
Society of Automotive Engineers, SAE Manual on Shot Peening, No Date or Edition found, p. 15.

* cited by examiner

*Primary Examiner*—Joseph J. Hail, III
*Assistant Examiner*—Anthony Ojini
(74) *Attorney, Agent, or Firm*—Barnes & Thornburg

(57) ABSTRACT

An improved method and apparatus for media blasting a workpiece 20 is described. The media blasting apparatus 10 of the present invention includes a media reclaim and recycle system 35, which reduces media wastage, advantageously improves peening of a workpiece 20 and provides better coverage of the workpiece surface. The media blasting apparatus 10 also includes a pressure chamber 90 for creating a media blast stream, a media metering valve 105 for controlling media flow rate and a powered part hold-down apparatus 130 for holding the workpiece 20 in a predetermined position during a blasting operation. The controlled media flow rate in combination with the powered hold down of the workpiece 20 ensures even and thorough peening of a workpiece surface.

26 Claims, 3 Drawing Sheets

MEDIA BLASTING APPARATUS AND METHOD TO PREVENT GEAR PITTING

CROSS REFERENCE

This patent application is a continuation-in-part of U.S. patent application Ser. No. 09/393,457 filed Sep. 10, 1999 now U.S. Pat. No. 6,238,268 which claims the benefit of the filing date U.S. Provisional Application Serial No. 60/099,996, filed Sep. 11, 1998.

BACKGROUND OF THE INVENTION

This invention relates generally to a method and apparatus for media blasting and more specifically relates to an improved method and apparatus for media blasting a workpiece or part. This invention preferably uses the powered part hold-down apparatus of U.S. Pat. No. 5,272,897, the disclosure of which is hereby incorporated by reference.

In the finishing of machined or fabricated parts or workpieces, the use of media blasting or peening to increase the fatigue strength of a workpiece or part is well known. An example of such a part is a gear utilized in automobile transmissions. Once these gears are formed, they should be processed by media blasting machines and the like to ensure that the gears meet government and manufacturer specifications, as well as to ensure that the gears are suitable for performing their intended functions.

Usually, the workpiece or part is placed in a closed chamber, in which a blasting means or a blasting system is located. A typical blasting system is a suction type system, which includes a media feed hose and an air supply hose interconnected at a suction gun. When the blasting system is actuated, the suction gun is turned on. This, in turn, causes media to be drawn from a storage hopper and into the media feed hose. The media are drawn through the media feed hose to the suction gun, where the media are then mixed with air from the air supply hose. After mixing of the media and air, the suction gun directs a stream of the air/media mixture against the workpiece, to provide compression stress to the surface by means of the colliding media.

Media blasting operations/systems of this type have a number of problems. Although media blasting strengthens the workpiece, it may also roughen the surface of the workpiece and/or result in an uneven surface finish. Surface roughness or an uneven surface finish decreases the hardness of the workpiece and can interfere with its intended function. For example, surface roughness or uneven surface finish in a gear interferes with the ability of the gear to mesh. Moreover, a workpiece having an uneven surface finish is susceptible to crack propagation, which can result in workpiece failure. Thus, it is important that the surface finish be evenly dimpled with a uniform distribution of peaks and valleys, as an uneven distribution contains deeper valleys which can propagate as cracks.

A further problem with media blasting operations/systems of this type result from the use of suction means to provide the media blast stream. As discussed above, in media blasting or shot peening operations, the dimple formation on the workpiece must be carefully controlled. In regulating dimple formation, the velocity of the media is an important control parameter. However, with suction guns it is difficult to control the flowrate of the media blast stream. It is also difficult to adjust the flowrate when changing from use of one type of media to another type, as the air velocity and media flow rate cannot be adjusted independently. Moreover, in a suction gun the media and air are mixed immediately prior to ejection, which may not allow the media to develop sufficient velocity to provide desired compressive stress.

Prior art methods have attempted to solve the problems of surface roughness or uneven surface finish by using glass beads. Although glass beads tend to reduce surface roughness, they may not sufficiently increase the fatigue strength of the workpiece. A further problem with this and other prior art methods is the difficulty of obtaining even peening of the workpiece surface. This problem arises, in part, from the lack of directivity of the media. Prior art methods also suffer from a high wastage of media, due to attrition of the media during the blasting process. The high wastage of media reduces both the operational efficiency and cost-effectiveness of a blasting operation.

Japanese patent application number H6-217214, entitled "A Strengthening Method For Metal Parts," filed Sep. 12, 1994, in the name of Honda Motor Company, Ltd., describes a media blasting method which attempts to alleviate some of the above mentioned problems. This Japanese application describes a metal strengthening method in which a stream of water and glass beads is directed toward a metal part. Use of water as a suspending medium imparts directivity to the glass beads. It also provides additional compression stress and provides a polishing effect. Although use of water improves the surface smoothness of the workpiece and the directivity of the media, it introduces additional problems without addressing the problem of media wastage or media flow control. In particular, use of wet media complicates design of the media blasting system, because all the parts of the media blasting system have to be designed for the presence of water. For example, care must be taken to avoid creating an electrolytic junction. Use of water also limits the type of workpieces that can be processed and the type of media which can be blasted. For example, it would be undesirable to use this method with a workpiece which is susceptible to corrosion.

Accordingly, a media blasting apparatus and method according to the teachings of the present invention is intended to solve problems inherent in the prior art media blasting systems discussed above, as well as others. A media blasting system and method according to the present invention increases operational efficiency, reduces media wastage and media use, provides even peening of a workpiece surface, provides a polishing effect or an even surface finish, and, moreover, obviates use of a high directivity media stream.

Another approach to providing gears with the desired surface wear and strength characteristics has been to coat the finished gears with various surface treatments such as Diamond Black and Balzers. One such treatment is sold by Balzers WC/C under the tradename Balimit WC/C™. Another such surface treatment is sold under the tradename Black Diamond™ by Body Coat. Such surface treatments can be disadvantageous for two reasons. First, the gears must be coated after they have been manufactured which typically requires the machined gears to be shipped to a specialty coating vendor to undergo a time-consuming, multi-step process and then be returned to the manufacturer. This process of shipping and coating off-site can slow the manufacturer's production cycle. Secondly, the use of such surface treatments is frequently far more expensive than is desired.

It has also been recently discovered that for certain metal surfaces, media blasting with glass or steel media has been less effective than is desirable for workpieces, such as gears. For instance, it has been observed that the use of glass or steel media for blasting of gear surfaces made from such metals can result in ill-defined dimples which are believed to provide less retention of oil on the gear surface. This is believed to result in less lubrication on the gear surface during operation in a transmission which can contribute to faster wear and more gear tooth pitting than is desirable.

Another problem with prior conventionally peened gears is the formation of "plus tips". Plus tips are formed when the tip of the gear tooth peak becomes flattened and slightly undercut on the adjacent area of the gear face during peening. The formation of "plus tips" on gear tooth peaks are associated with excessive gear noise in the transmission during operation.

OBJECTS AND SUMMARY OF THE INVENTION

A general object of the present invention is to provide a media blasting apparatus and method which provides improved workpiece peening.

Another object of the present invention is to provide a media blasting apparatus and method which reduces media use and wastage.

An additional object of the present invention is to provide a media blasting apparatus and method which obviates use of a high directivity media stream.

A further object of the present invention is to provide a media blasting apparatus and method which allows control of media flowrate by using a pressurized system.

Yet another object of the present invention is to provide a media blasting apparatus and method which provides even peening of a workpiece surface and a uniform surface finish.

An additional object of the present invention is to provide a media blasting apparatus and method which provides effective peening of hard-to-reach surfaces of a workpiece.

A still further object of the invention is to provide a method for processing gears to provide improved gear root radius strength, reduced gear tooth surface pitting, avoidance of "plus tip" formation on gear teeth, as well as more and better defined surface dimples on the gear.

Further objects and advantages of the present invention will become apparent from a consideration of the drawings and ensuing description.

Accordingly, one embodiment of the present invention provides a media blasting apparatus in which a workpiece to be treated is held in a predetermined position during processing by the powered part hold-down apparatus of U.S. Pat. No. 5,272,897 and including a media reclaim and recycle system. The present invention also provides a media blasting method in which a smaller mass flow rate of media is blasted at higher velocity and for a longer time than in prior art methods to produce desired results.

The present invention further provides a method of media blasting a workpiece with a ceramic blasting media including the steps of positioning a workpiece in a part holder for maintaining the workpiece in at least one predetermined position during a blasting operation, supplying positive air pressure to deliver ceramic media to a blast nozzle, directing a ceramic media mix at the workpiece through the blast nozzle, exposing a plurality of surfaces on the workpiece to the ceramic media and collecting the ceramic media for reuse in a subsequent blasting operation.

The present invention further provides a method of media blasting a metallic gear with a ceramic blasting media including the steps of positioning a workpiece in a part holder for maintaining the workpiece in at least one predetermined position during a blasting operation, directing a ceramic media mix at the workpiece, and exposing a plurality of surfaces on the workpiece to the ceramic media.

The present invention further provides a method of media blasting a metallic gear with a fine steel media including the steps of positioning the metallic gear in a part holder to maintain the metallic gear in one or more predetermined positions during a blasting operation; directing a metallic shot having a diameter of between about 150 microns and about 200 microns at the metallic gear part; and exposing a plurality of surfaces on the metallic gear to the directed media.

BRIEF DESCRIPTION OF THE DRAWINGS

The present invention will now be described, by way of example, with reference to the accompanying drawings in which.

DETAILED DESCRIPTION OF PREFERRED EMBODIMENTS

Figure 1:
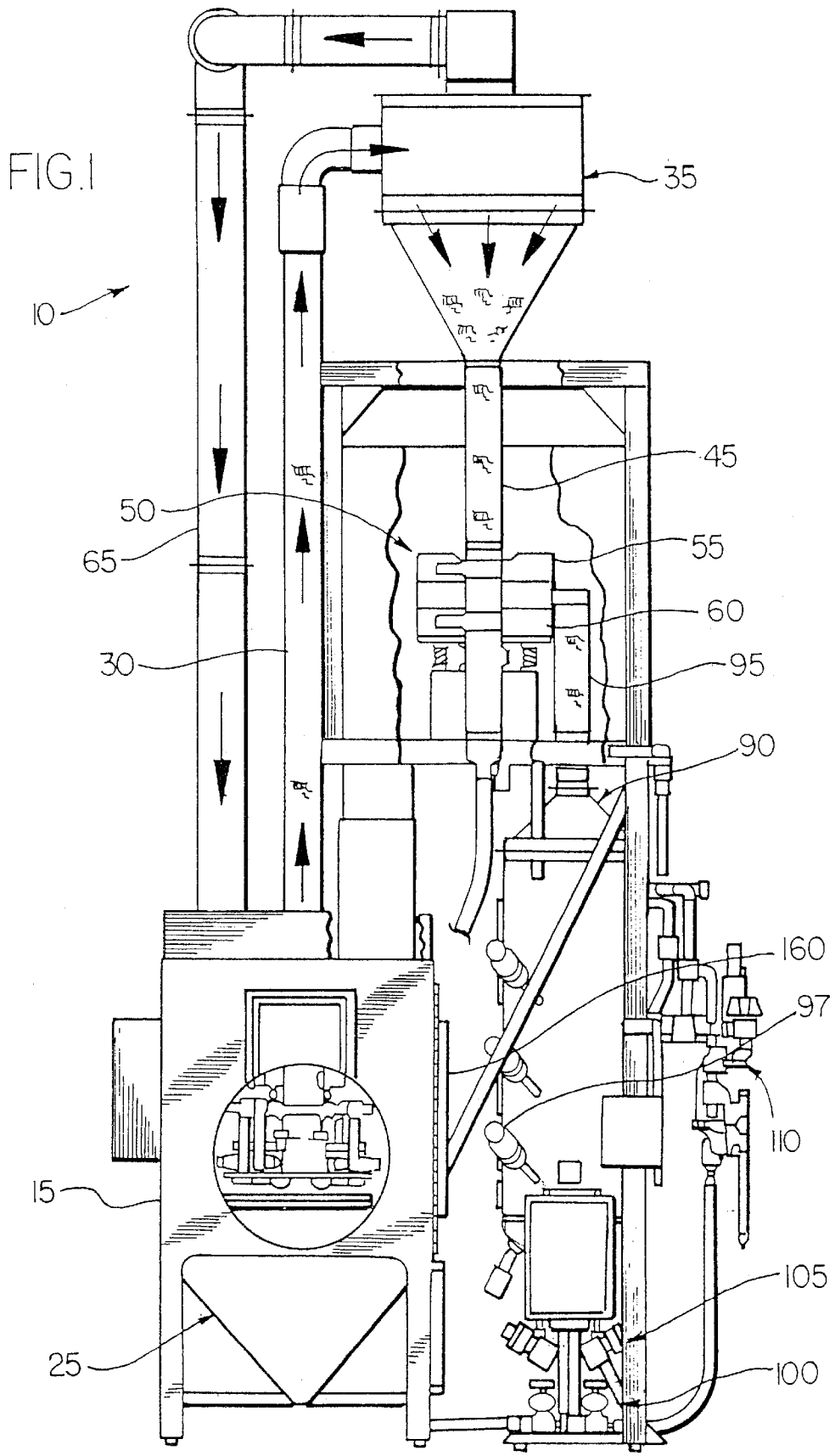
FIG. 1 is a front elevational view of a media blasting apparatus for treating a workpiece according to the invention.
Figure 2:
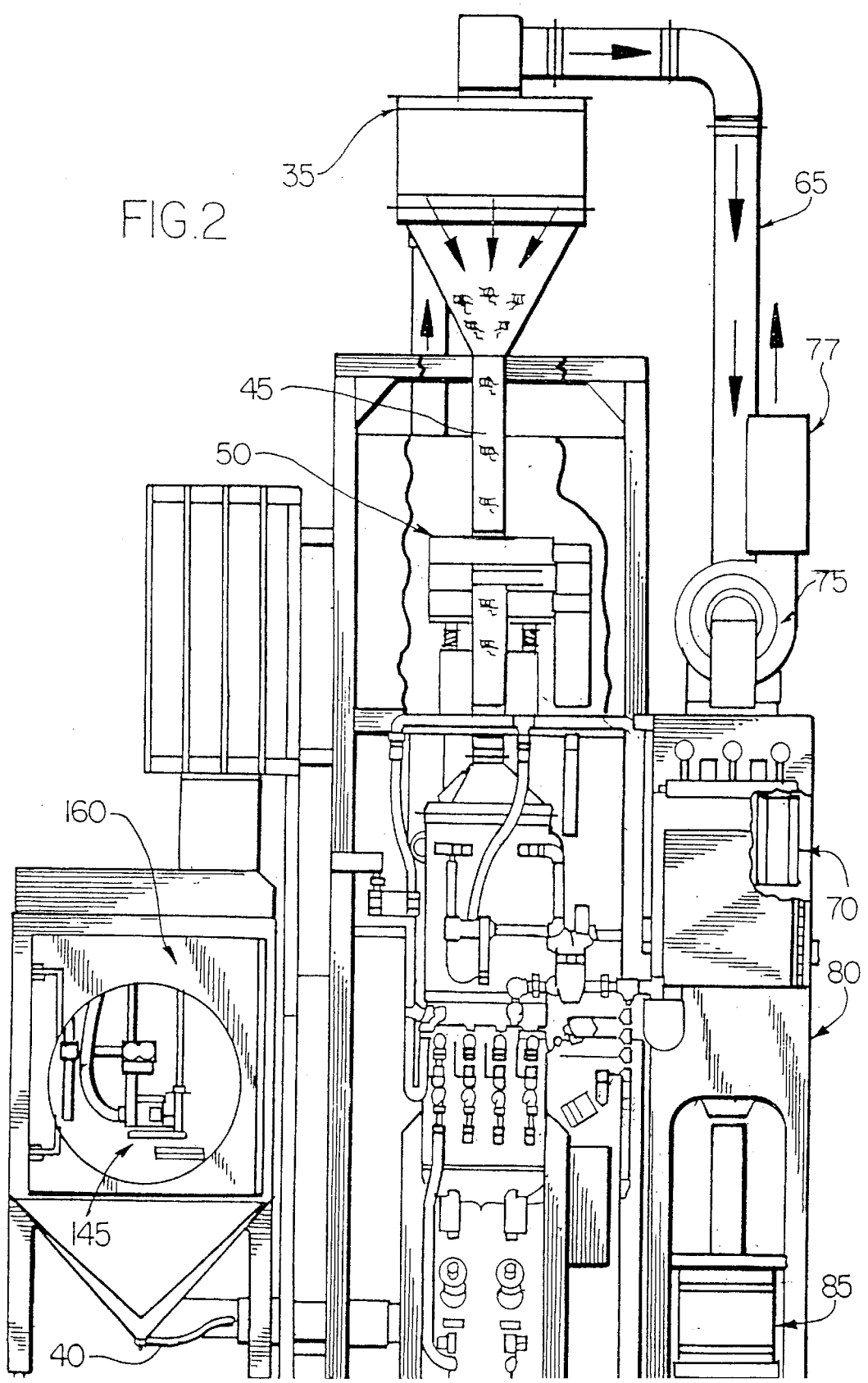
FIG. 2 is a right-side elevational view of the media blasting apparatus for treating a workpiece according to the invention.

Referring now to the drawings, FIG. 1 shows a front view of a media blasting apparatus according to the invention, generally indicated by the number 10. As illustrated, the media blasting apparatus 10 includes a blasting cabinet or chamber 15, in which a stream of media is directed against a workpiece 20. Such media may comprise, for example, glass, ceramic or fine steel beads. The cabinet 15 is connected to a cabinet media hopper 25 for collecting the media that fall after collision with the workpiece 20. The fallen media will include broken pieces of media which have been recycled, as well as virgin or unbroken pieces. A conduit 30 connects the cabinet media hopper 25 to a media reclaim system, generally indicated by the number 35. As best illustrated in FIG. 2, the cabinet media hopper 25 is also connected to air supply means 40. The air supply means 40 provides air flow to the cabinet media hopper 25, for forcing the collected fallen media up through the conduit 30 to the media reclaim system 35.

As illustrated in FIGS. 1 and 2, the media reclaim system 35 includes a conduit 45 for conveying collected media to separation means 50. The separation means 50 is a two-deck system comprising a top screen 55 and a bottom screen 60. In a preferred embodiment of the present invention, the top screen is between 20 and 40 mesh gauge and the bottom screen is between 170–200 mesh gauge. The separation means 50 generally separates the fallen media into unbroken media and broken media of sufficiently large size to be recycled for use in the blasting operation and fines or dust which cannot be reused. The separator screens 55 and 60 are constantly vibrated to increase the efficiency of separation.

The media reclaim system 35 also includes a conduit 65. Conduit 65 is connected to a filter system 70 and to a blower-motor system 75. In a preferred embodiment, the blower-motor system 75 includes a blower muffler 77 for noise reduction. The blower-motor system 75 draws air from conduit 65, creating an upward draft in conduit 45 which carries the fines/non-reusable media from the separation means 50 up through conduit 45 into conduit 65 and into the filter system 70. The filter system 70 is connected to a dust collector 80 for collecting the fines and broken media. These are collected into a drum 85, which is periodically removed and emptied. In a preferred embodiment, the drum 85 is adapted to be rolled away and emptied. For example, the drum 85 may be coupled to a dolly.

As illustrated in FIG. 1, the separation means 50 is connected to a double pressure chamber 90 via a conduit 95. A media path is defined between the cabinet media hopper 25 and the pressure chamber 90. In a preferred embodiment, the double pressure chamber is held between 70 and 80 psi. The conduit 95 delivers the reclaimed reusable media to the double pressure chamber 90 where the reclaimed and reusable media are mixed with virgin media. In a preferred embodiment, the reclaimed media are of a mesh size greater than 100 mesh and the virgin media are of a mesh size between 60–100 mesh and preferably between 60–80 mesh. As stated previously, in the present invention, the media may comprise glass, ceramic, or fine steel beads. The virgin media are supplied to the double pressure chamber 90 through a plurality of media supply valves 97. The double pressure chamber 90 is also coupled to a media sensor monitor 100 for automatically controlling the supply of the virgin media. The supply of the virgin media is controlled to ensure adequate peening of the workpiece. Specifically, the supply of the virgin media is controlled to ensure that adequate compression stress is provided to the workpiece 20 so that a sufficiently high fatigue strength is obtained.

Advantageously, the double pressure chamber 90 also includes an automatic media metering on/off valve 105. The automatic media metering on/off valve 105 regulates the supply of the virgin/recycled media mixture to an air/media mix point, where the media are suspended in air. An automatic air valve 110 is coupled to the double pressure chamber 90 for suspending the media in air at the air/media mix point and then conveying the suspended media to the blasting cabinet 15 via blasting hoses 115.

The automatic metering on/off valve 105 in the present invention allows improved control of the media flow rate, as the media supply and air supply can be independently controlled. The presence of the automatic metering on/off valve 105 in the present invention is made possible by the use of a pressurized blasting system, rather than a suction type system, to deliver the media. In a suction type system, suction force is relied on to draw media from a media supply, through a media supply hose, to the suction gun. The presence of a metering valve 105 in a suction system, however, would reduce the pressure drop in the media supply hose causing a reduction in the suction force. The reduced suction force would, in turn, interfere with the delivery of media. The present invention, on the other hand, is a pressure driven system and so positive pressure can be relied on to force media through the media metering valve 105 to the media mix point.

A further advantage of the pressurized system of the present invention is that it helps ensure an adequate media velocity is obtained. As mentioned above, media velocity is an important control parameter in ensuring that sufficient compressive stress is provided to a workpiece 20. The pressurized system of the present invention helps ensure an adequate media velocity through control of the media flowrate and through the positioning of the air/media mix point. The media flowrate is controlled through the media metering valve 105. The air/media mix point is located sufficiently far from the blast hose so that the media have time to develop a desired or adequate velocity.

Figure 4:
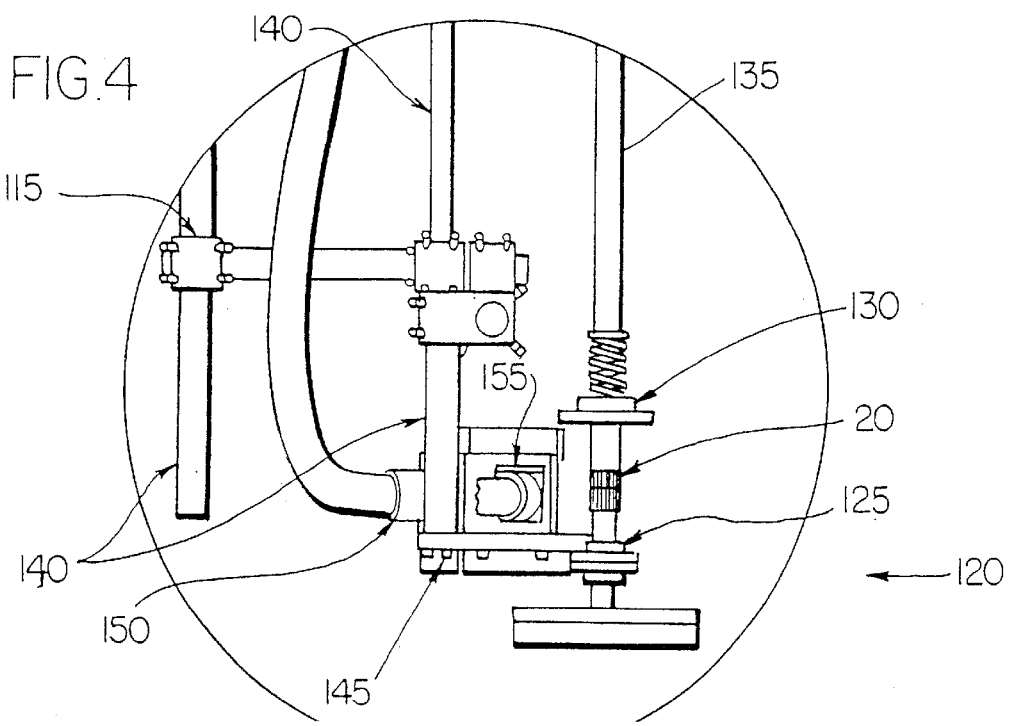
FIG. 4 is an enlarged, partial fragmentary, side elevational view of a blast station of the media blasting apparatus for treating a workpiece according to the invention.

A blasting station 120 inside the blasting cabinet 15 will now be described. As illustrated in FIG. 4, the workpiece 20 to be processed, i.e., blasted with media, is mounted on a part holder 125. Preferably, the part holder 125 has been hardened. The workpiece 20 is held in a predetermined position by a powered part hold-down apparatus 130. In the present invention, the powered part-hold-down apparatus 130 is preferably that described in U.S. Pat. No. 5,272,897, to which reference is again invited. The subject matter of U.S. Pat. No. 5,272,897 is incorporated herein by reference. The patented powered part-hold-down apparatus 130 provides variable, compensating, cushioned clamping for maintaining the workpiece 20 in the predetermined position during media blasting. The device as taught in U.S. Pat. No. 5,272,897 is very important to facilitate processing high volume quantities of parts. This is especially important for parts such as gears which tend to rotate when peened since the hold-down device prevents free spinning of the parts. The hold-down device also controllably rotates the parts at a desired rate of rotation. Rotation of the powered part-hold-down apparatus 130 is provided via a rotatable shaft 135.

Figure 3:
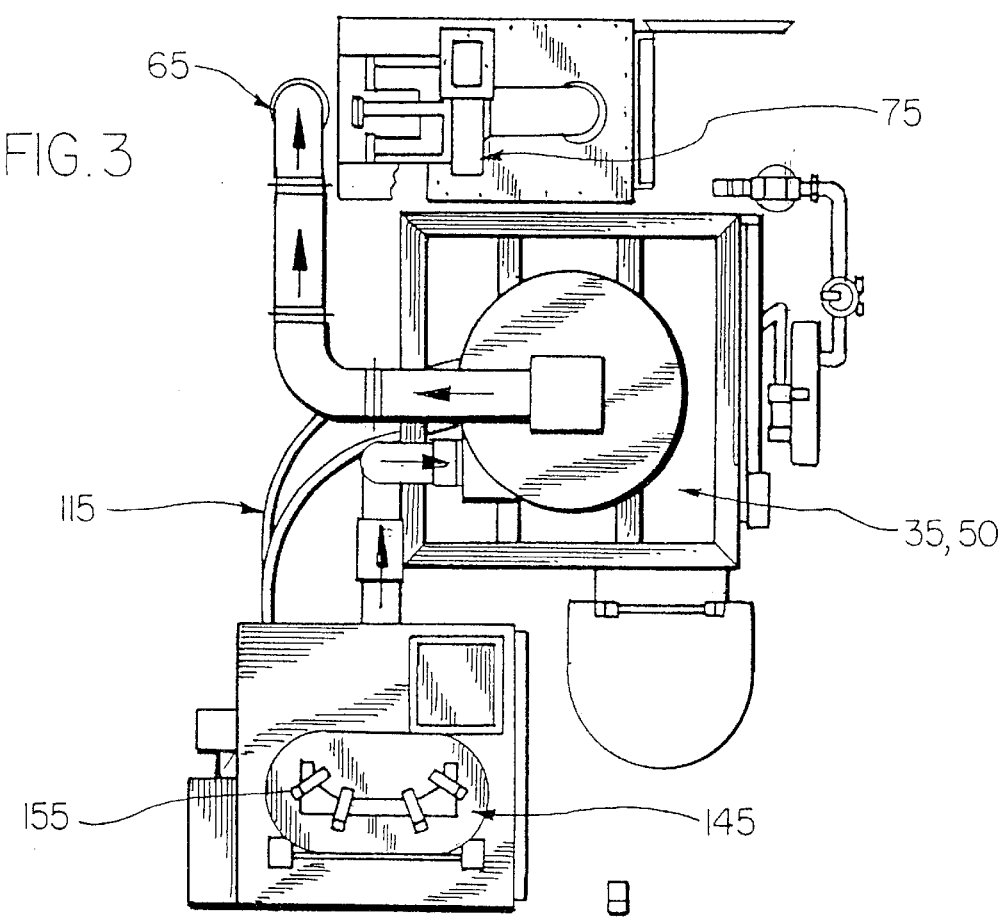
FIG. 3 is a top plan view of the media blasting apparatus for treating a workpiece according to the invention.

Hardened rods 140, preferably steel, provide a support system for a gun-rack assembly 145. The gun-rack assembly 145 holds a nozzle holder 150. A blast nozzle 155, to which the blasting hoses 115 are connected is attached to nozzle holder 150. The blast nozzle 155 directs a stream of media, suspended in air, against the surface of the workpiece 20. Preferably, the blast nozzle is positioned between approximately four to eight inches away from the workpiece 20. Although, only one blast nozzle 155 is illustrated in FIG. 4, it will be understood to those skilled in the art that a plurality of blast nozzles 155 could be used. In a preferred embodiment of the present invention, four such blast nozzles 155 are located in the blasting cabinet 15, as shown in FIG. 3. The blasting cabinet 15, containing the part-hold-down apparatus 130 and blasting apparatus is also provided with a door 160 for installation of a new workpiece 20.

The operation of the present invention will now be described. After a workpiece 20 is placed in the part-hold-down apparatus 130, door 160 is closed. A stream of media suspended in air is then directed against the workpiece 20 by the blast nozzle 155. As the media are blasted, the workpiece is controllably rotated by the powered patented part-hold-down apparatus 130. This controlled rotation ensures even peening of the surface of the workpiece 20 and obviates use of a high directivity stream of media, hence making the use of water-supported media unnecessary.

The powered part-hold-down apparatus is preferably rotated at between 8–12 rpm. A rate of rotation of 10–12 rpm, however, has been found to be particularly effective for treatment of gears. The rate of rotation can be related to the degree of peening required and to the evenness of dimpling on the resulting surface. A slow controlled rotation permits even peening with uniform small dimpling and prevents the media stream from striking the surface unevenly, resulting in indentations that could act as crack precursors. Thus, for example, if the workpiece 20 is a gear, the controlled rotation ensures that media, e.g. ceramic, fine steel, or glass beads, are directed towards the root and tooth face of the gear during the course of the rotation. By ensuring even peening, the operational characteristics of the workpiece 20 are improved.

In the preferred embodiment of the present invention, a smaller mass flowrate of media is blasted at higher velocity and for a longer time than in the prior art methods. The preferred flowrate depends on the type and size of media used, as well as the particular application involved. For treatment of gears, we have found a media flowrate of approximately 1.5–3 lb/minute to be effective. Of course, other flowrates could be used, depending on the results desired. This flowrate was found to be effective with glass media, ceramic media, and fine steel media of mesh size falling in the range of 50–100 mesh. In a preferred embodiment of the present invention, however, 60–100 mesh glass media are used. When 60–100 mesh glass media were used to treat certain gears, including those made using 8620 steel, a marked improvement in the operational characteristics of such gears was observed. The choice of media to be used depends upon the application and the relative economics. Ceramic and steel media last longer than glass; however, these media are more expensive.

After the media collide with the workpiece 20 they fall into the cabinet media hopper 25 and are then conveyed to the reclaim system 35. The reusable media are separated from the fines and dust and are returned to the blasting station 120 after mixing with virgin media. Such mixing reduces media wastage. The reuse of partially broken media also improves the polishing effect of the media upon the workpiece 20.

Thus, an improved method and apparatus for the media blasting of a workpiece have been described. The method and apparatus of the present invention reduce media wastage through use of a novel media reclaim and recycle system. Use of recycled media has the additional advantageous effect of improving polishing of a workpiece. The present invention also ensures even peening and a uniform surface finish through use of a powered part hold-down apparatus, such as the preferred apparatus described in U.S. Pat. No. 5,272,897, which can obviate the use of a high directivity media stream and its associated complications. Improvements in peening and surface finish are also provided in the present invention by use of a pressurized system to create and deliver the media blast stream. The present invention, moreover, reduces media use, by blasting a smaller mass flow rate of media at higher velocity and for longer periods of time than in conventional methods.

In another preferred embodiment of the invention, a ceramic media is used with the apparatus disclosed herein for media blasting treatment of the surface of gears. While it has been found that satisfactory results may be achieved using glass media for blast treatment of certain gears, including those made of ceratin metals such as 8620 steel, gears made with other materials such as 5130 m steel have proved to be less than desirable using glass media. In general, the blast treatment with ceramic media of the invention has been found to be effective with a broad assortment of gear types made from a variety of metals. A number of oxide ceramics may be used in the process, such as for example, $ZrO_2$, $AL_2O_3$, $SiO_2$, $MgO$, etc. The preferred media includes a crystalline zirconia uniformily enclosed in a silica glassy phase. Such media are sold under the tradename ZIRBLAST™ and ZIRSHOT™ by SEPR Co. of Paris le Defense, France.

Surprisingly, the blast treatment using ceramic media has been found to produce significantly better results then for blast treatment using glass treatment for certain metallic gears, e.g., in providing improved resistance to pitting of gear teeth surfaces as well as improved strength in the gear tooth root radius relative to prior methods. For such gear applications, it has been found that the ceramic media from between 40 to 100 virgin mesh, a flow rate of between 1 to 25 pounds per minute, cycle time between 15 seconds and 180 seconds, pressure of between 35 and 90, a rotation rate of the gear of between about 5–25 rpm, and an Almen intensity of between 15 n and 28 n are effective in treating gears. Superior results have been observed in such gears under preferred processing conditions which included a small mass flow rate of between 1 and 3 pounds per minute, a pressures of between 70 and 80 psi, cycle time of between 15 seconds and 120 seconds, a rotation rate of the gear of about 8–12 rpm, media diameter of between about 0.210 mm and 0.150 mm mesh. Preferably, since ceramic media is relatively expensive, it is collected after blasting the gear and recycled by adding it to virgin media such that, after initial start up of the system, a recycled media mixture including virgin media and recycled media is used. In this preferred process, a 170–200 mesh screen is used as a bottom screen in the separation means of the media reclaim system to exclude small media fragments from the recycled media mixture.

Utilizing the preferred ceramic media process gears have been produced having superior compression in the gear tooth face and root radius region, more and better defined dimples on the gear surface, and no "plus tip" formation at the tip of a gear tooth, thus reducing or eliminating gear tooth pitting after dynamometer testing. This process has also been used to eliminate Diamond Black™ and Balzer WC/C™ coatings that were applied to the gears for reduction of gear tooth pitting. While the invention is not intended to be confined to any theory for the superior performance of gears treated with this method, it is believed that the more numerous and better defined dimples in the gear surfaces help to retain oil and lubricate gears when gear surfaces mesh during use in a transmission. Using the ceramic blast treatment method described herein, gears have been produced with a residual compressive stress in the gear root radius of between at least 80 Kpsi at the surface and in the gear surface of at least 80 Kpsi measured at the surface. At depths of 0.0005, 0.001 and 0.002 the residual compressive stresses typically will be at least 100 Kpsi. Using the preferred process parameters of the ceramic blast treatment method, gears have been produced with a residual compressive stress in the gear root radius of at least 100 Kpsi with typical valves of at least 130 Kpsi at a depth of 0.000 inch (surface), 175 Kpsi at 0.0005 inch, 200 Kpsi at 0.001 inch and 225 Kpsi at 0.020 inch.

For gears treated by the preferred ceramic media blasting method, dynamometer tests confirm that gears so treated exhibit superior performance relative to gears treated with glass media under similar conditions. It has been found that gears treated with this preferred process exhibit superior fatigue strength having performed adequately with little evidence of wear for as many as 200 hours in dynamometer testing. In contrast, un-coated gears, treated by conventional peening methods can be expected to fail in as little as 20 hours in dynamometer testing.

It is contemplated that the process of treating gears described herein may be performed on premises at an automotive manufacturer. It has been demonstrated that the present method of ceramic media treatment of gears can be performed effectively on the finished gear with bushing pressed in so that the gear can be transferred directly from treatment to an ultrasonic washing station (which includes a rust inhibitor), dried and sent directly to final assembly. This ability further adds to the cost advantages the processes of the invention have over coating of gears with surface treatment such as Diamond Black and Balzers WC/C.

In a still further embodiment of the invention, a method of treating a metallic gear with a fine metallic media blast stream is illustrated utilizing the apparatus described above. The preferred method includes a media flow rate between about 1 and 4, a diameter of the media between about 150 micron and 200 micron, a pressure between about 70 and 80 psi, an Almen range between about 18N and 26N. Preferably, the fine steel media is collected after blasting the gear and is recycled.

As steel shot media lasts significantly longer than ceramic or glass media, very little virgin media is required to be added to the apparatus. This results in significant reduction in the monitoring, and maintenance requirements as well as in the amount of media used for successful mass processing of gears. Metallic gears treated in this manner typically have fewer and less well defined dimples on their surface structure then for the media blasting processes disclosed herein using glass or ceramic media. Moreover, the gears so treated exhibit lesser fatigue strength then glass media and ceramic media treatments disclosed herein. However, in dynamometer testing, the fine steel media exceeded 70 hours of continuous use prior to failure which significantly exceeds the 40 hour to failure result expected on coated gears. Due to the reduced maintenance, monitoring, and media costs, the fine steel media process disclosed herein is a lower cost method which provides superior results to conventional shot peening of gears. Fine steel media peening is sufficient for many gears which exhibit good surface pitting resistance. When much higher degree of pitting is exhibited during dynamometer testing of gears, media blast treatment with ceramic media is preferred.

While each of the methods of media blast treatment for gears disclosed herein have been illustrated in the preferred embodiments utilizing the patented part hold down apparatus as well as media blasting apparatus in accordance with one embodiment of the invention, it is contemplated that other conventional part holders and blasting apparatus may also be used with the methods described herein. Such conventional apparatus may including a suction-type system.

The applicant has provided description and figures which are intended as an illustration of certain embodiments of the invention, and are not intended to be construed as containing or implying limitation of the invention to those embodiments. It will be appreciated that, although applicant has described various aspects of the invention with respect to specific embodiments, various alternatives and modifications will be apparent from the present disclosure which are within the spirit and scope of the present invention as set forth in the following claims.

What is claimed:

1. A method of processing a metallic gear with media blast stream to enhance wear properties of the gear tooth root radius comprising the steps of:
    positioning the metallic gear in a part holder to maintain the metallic gear in one or more predetermined positions during a blasting operation;
    directing a ceramic medium having a diameter of less than about 250 microns at the metallic gear at a pressure of between about 50 and 90 pounds per square inch; and
    exposing a plurality of surfaces on the metallic gear to the directed ceramic media thereby to enhance wear properties of the gear tooth root radius.

2. A method according to claim 1 wherein the ceramic medium is a ceramic bead including zirconia crystals enclosed in a silica glassy phase.

3. A method according to claim 1 further comprising the step of collecting the ceramic media for reuse in a subsequent blasting operation.

4. A method according to claim 3 wherein the ceramic media is a recycled media mixture including a mixture of virgin media and recycled media.

5. A method according to claim 1 wherein the step of exposing a plurality of surfaces on the gear to the directed ceramic media includes rotating the metallic gear from between about 8 and about 12 revolutions per minute.

6. A method according to claim 1 wherein said ceramic media is directed at the metallic gear at a pressure of between about 50 and 90 pounds per square inch.

7. A method according to claim 1 wherein the ceramic media is directed at the metallic gear at a pressure of between about 25 and about 90 pounds per square inch and wherein the ceramic media has a diameter of between about 0.210 mm and about 0.150 mm when added as virgin media.

8. A method according to claim 1 wherein the Almen intensity of the media blast procedure is between about 17N and about 26N.

9. A method of preparing a compressively stressed region on a tooth surface and a root radius of a plurality of gear teeth of a metallic gear to enhance the wear properties of the metallic gear comprising:
    positioning a metallic gear in a part holder;
    directing a ceramic media of a size, density and selected Almen intensity at the metallic gear to cause residual compressive stresses at a plurality of gear teeth of at least 80 Kpsi at depths between 0.000 inch and 0.002 inch in the tooth root radius thereby enhancing the wear properties of the metallic gear.

10. A method according to claim 9 wherein the residual compressive stress is at least 80 Kpsi at depths of 0.000 inch, 0.0005 inch and 0.001 inch.

11. A method according to claim 9 wherein the residual compressive stress is at least 130 Kpsi at a depth of between 0.000 inch and 0.001 inch.

12. The method according to claim 9 wherein the residual compressive stress is at least 120 Kpsi at a depth of 0.000 inch, at least 150 Kpsi at 0.0005 inch, at least 180 Kpsi at 0.001 inch, and at least 200 Kpsi at 0.0020 inch.

13. The method according to claim 9 wherein the diameter of the ceramic media is between about 50 mesh and about 100 mesh when added as virgin media.

14. The method according to claim 9 further comprising the step of collecting the ceramic media for reuse in a subsequent blasting operation and wherein the ceramic media is a recycled media mixture including a mixture of recycled and virgin media.

15. The method according to claim 9 wherein the step of exposing multiple surfaces of the workpiece to the ceramic media includes the step of rotating the workpiece at between 8–12 revolutions per minute.

16. The method according to claim 9 wherein the ceramic media is directed at the workpiece at a pressure of between about seventy to about eighty pounds per square inch.

17. The method according to claim 9 wherein the cycle time for directing media at a workpiece is between about 60 and about 80 seconds.

18. The method according to claim 9 wherein the flowrate of the ceramic media being directed at the workpiece is between about 1.5 and about 3 pounds per minute.

19. The method according to claim 9 wherein the ceramic medium is a ceramic bead including zirconia crystals enclosed in a silica glassy phase.

20. The method according to claim 9 wherein the ceramic media is directed at the metallic gear at a pressure of between about 50 and about 90 pounds per square inch and wherein the ceramic media has a mesh dimension of between about 50 and about 120 mesh when added as virgin media.

21. The method according to claim 9 wherein the Almen intensity of the media blast procedure is between about 18N and about 26N.

22. A method of processing a metallic gear with a fine steel media blast stream to enhance the wear properties of the metallic gear comprising the steps of:

positioning the metallic gear in a part holder to maintain the metallic gear in one or more predetermined positions during a blasting operation;

directing a fine steel media having a diameter of of less than 250 microns at the metallic gear part at a nressure of between about 50 and 90 pounds per square inch; and exposing a plurality of surfaces on the metallic gear to the directed fine steel media thereby enhancing the wear properties of the gear tooth root radius of the metallic gear.

23. The method according to claim 22 wherein the flow rate is between about 1 to about 4 pounds per minute.

24. The method according to claim 22 wherein the cycle time is between about 10 and about 60 seconds.

25. The method according to claim 22 wherein the pressure is between about 70 and about 80 psi.

26. The method according to claim 22 wherein the Almen range is between about 18N and about 26N.

* * * * *